Aug. 17, 1937.  S. W. FARNHAM  2,089,997
CABLE REEL LOCOMOTIVE
Original Filed July 12, 1930
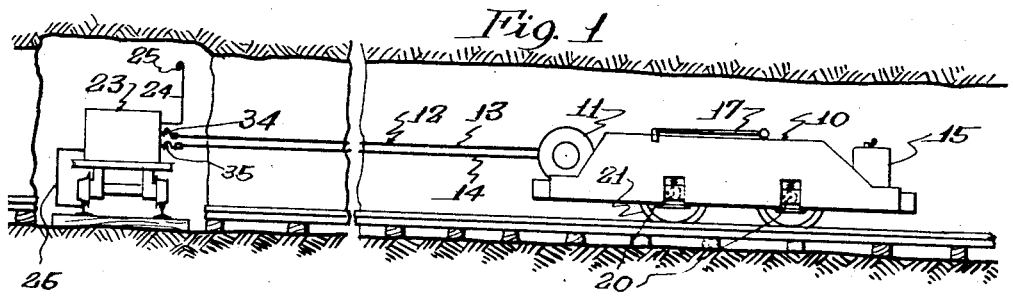
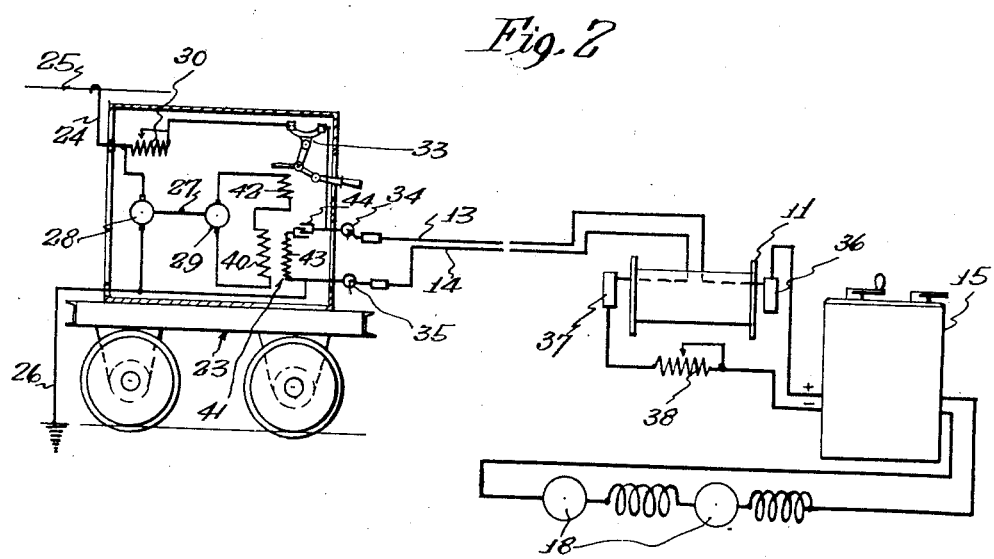
Inventor
Sidney W. Farnham
Clarence F. Poole
Attorney Patented Aug. 17, 1937

2,089,997

UNITED STATES PATENT OFFICE 2,089,997

CABLE REEL LOCOMOTIVE

Sidney W. Farnham, Chicago, Ill., assignor to Goodman Manufacturing Company, Chicago, Ill., a corporation of Illinois Application July 12, 1930, Serial No. 467,419
Renewed January 2, 1932

5 Claims. (Cl. 191—12)

This invention relates to improvements in cable reel locomotives of the type utilized in gaseous mines and has, among other objects, to reduce the hazards accompanying the use of a flexible cable for conducting power to the locomotive due to breakage of the cable caused by accidentally running over the cable while it is in use, or failure of insulation of the cable or locomotive wiring, which failure may cause an arc sufficient to cause an explosion in the mine.

The invention consists in providing a means to cut off the current to the cable and locomotive upon failure of insulation or upon running over the cable.

My invention may best be understood with reference to the accompanying drawing wherein:

Figure 1 is a diagrammatic view of a mine locomotive provided with a cable reel which is connected to a junction box at the source of current supply; and Figure 2 is a schematic wiring diagram of the device embodying my invention.

A locomotive 10 is provided with a cable reel 11 of the usual form and a conductor cable 12, herein preferably shown as having two conductor wires 13 and 14 insulated from each other in the usual manner connected to said cable reel. The locomotive is adapted to be operated by direct current and is provided with a controller 15 of a usual construction which may have a suitable control and reverse drum incorporated therewith for starting and controlling the locomotive, or which may control the locomotive by means of electric contactors, the details of said controller not herein being shown since they are no part of my invention. Such locomotives are usually provided with a trolley for use in sections of the mine having trolley wire and having sufficient ventilation to safeguard against gaseous conditions. In the form shown, a trolley 17 is provided and is connected with the controller 15 whereby the main power connections may be set at will to operate on the trolley or reel in a usual manner (not shown).

The locomotive 10 is preferably provided with a pair of series wound direct current electric motors 18, which motors are operatively connected to axles 20 and wheels 21 to move said locomotive about the mine.

Referring now in particular to the novel features of my invention, a junction box 23 is provided. This junction box is shown diagrammatically in Figures 1 and 2 and is adapted to be placed preferably at the mine entry while the locomotive travels into the mine room on power obtained from the cable 12 to gather and haul the loaded cars from the room or to distribute empty mine cars into the various rooms.

A number of junction boxes may be placed at strategic places in the mine, but as shown in my invention, I herein prefer to mount one junction box on a portable truck so it may readily be moved about the mine by the mine locomotive when the mine locomotive is obtaining power from the trolley and it is desired to shift the junction box from one position in the mine to another.

Means are provided to connect the junction box 23 with the main source of power supply which comprises a positive conductor 24 adapted to be connected with a trolley line 25 in a usual manner, and a negative conductor 26 adapted to be connected to ground which is herein shown as the mine rail, which conductors transmit direct current to the junction box 23 and locomotive circuit.

The junction box 23 is provided with an alternating current source of power supply which may be of any suitable power supply means, but which is herein shown as a motor generator set 27 comprising a direct current motor 28 connected directly to an alternating current generator 29, which direct current motor 28 obtains power from the conductors 24 and 26.

A choke coil 30 is interposed in the positive line beyond the point of connection of the conductor 24 to the direct current motor 28. The positive line passes from the choke coil 30 to a circuit breaker 33 actuated by alternating current. The circuit breaker 33 is of an ordinary construction so will not herein be described in detail. The positive line passes from the circuit breaker 33 to a terminal 34 to which is connected the positive conductor wire 13 of the cable 12. The negative conductor 26 is connected to a terminal 35 to which is hooked the negative conductor 14 of the cable 12.

Means are provided on the cable reel 11 to collect the current from the conductors 13 and 14, which means are herein diagrammatically shown as collector rings 36 and 37. The collector rings 36 and 37 are of the usual construction so will not herein be shown or described in detail. Electric power passes from the collector ring 36 to the controller 15 and the motors 18, 18, and passes from these motors through the controller on the negative line through a choke coil 38, and collector ring 37, through the negative conductor 14, terminal 35 on the junction box 23, to ground through the negative conductor 26.

A transformer 41 is connected in the alternating current circuit generated by the generator 29 and is provided with a primary 40 shunted across said alternating current circuit, and a secondary 43 connected between the terminals 34 and 35. A condenser 44 is connected between the secondary 43 and the positive side of the direct current line to prevent direct current from entering said secondary. It may thus be seen that the alternating current generator 29 induces an alternating current circuit in the direct current line. When this alternating current circuit is built up and reaches a certain predetermined value it will load the generator 29 which will build up potential in a coil 42 for the circuit breaker 33 and actuate said circuit breaker.

The choke coils 30 and 38 are of an ordinary construction and have for their purpose to choke the alternating current generated by the alternating current generator 29 and prevent the passage of said alternating current into the locomotive circuit to eliminate any possibility of alternating current building up inside of the locomotive circuit which would cause the alternating current generator 29 to open the circuit breaker 33.

When the conductor 24 is connected to the trolley line 25 and the negative conductor 26 is connected to ground, the motor 28 will drive the alternating current generator 29. This will tend to build up an alternating current circuit in the transformer 41 and the cable 12. Upon short circuit of the conductors 13 and 14 of the cable 12 or upon grounding either the cables or the locomotive insulation, the alternating current circuit will be closed and thus the alternating current circuit will be built up in the secondary 43 of the transformer 41 and in the primary 40 of said transformer. This will load the alternating current generator 29 and send a sufficient current through the coil 42 of the circuit breaker 33 to open said circuit breaker and disconnect the main line direct current circuit from the cable 12.

It may now be clearly seen that an alternating current circuit has been superimposed on a direct current circuit so that when the locomotive is obtaining power from the cable 12, connected to the junction box 23, and said locomotive accidentally runs over the cable 12 and causes a short circuit of the conductors 13 and 14, or when parts of the locomotive become grounded, that the circuit generated by the alternating current generator 29 will be built up which will open the alternating current circuit breaker 33 and disconnect the cable 12 from the main line. This prevents sparking and burning at the point where the cable is broken and prevents the ignition of gas in the mine. This also effects protection for the locomotive itself, and prevents burning of the cable reel 11 or other parts of the locomotive. It may also be seen that this means for disconnecting the cable from the main line is equally effective when the insulation of the cable conductors become worn so as to cause a short circuit within the cable or when the insulation of the positive conductor of the cable becomes worn, and comes into contact with the mine rail or grounded parts of the locomotive.

While I have herein shown and described one embodiment of my invention, it will be understood that the construction and arrangement of the various parts may be altered or changed without departing from the spirit and scope thereof. Furthermore, I do not wish to limit myself to the form illustrated, excepting as it may be limited in the appended claims.

I claim as my invention:

1. In combination with a reel and trolley locomotive, a direct current circuit including a cable reel, a cable adapted to be wound on said reel and having a positive and negative conductor, a junction box remote from the locomotive having connection with a source of electric power and adapted to have said cable connected thereto, a motor generator set within said junction box comprising a direct current motor and an alternating current generator, a circuit breaker within said junction box interposed in the positive line between said source of electric power and said positive conductor of said cable, said circuit breaker being actuated by alternating current generated by said alternating current generator, means for transmitting alternating current through said cable and insulating said direct current circuit from said alternating current generator comprising a transformer having connection with said alternating current generator and the positive and negative conductors of said cable, a condenser interposed between said transformer and said positive conductor in said cable, and means to prevent the flow of alternating current from said cable to said locomotive to prevent loading of the locomotive circuit from opening said circuit breaker, but permitting grounds in the locomotive circuit to open said circuit breaker comprising a choke coil connected in said negative conductor of said cable between said junction box and the controlling mechanism for said locomotive.

2. In combination with a reel and trolley locomotive, a direct current circuit including a cable reel, a cable adapted to be wound on said reel and having a positive and negative conductor, a junction box remote from the locomotive having connection with a source of electric power and adapted to have said cable connected thereto, a motor generator set within said junction box comprising a direct current motor and an alternating current generator, a circuit breaker within said junction box interposed in the positive line between said source of electric power and said positive conductor of said cable, said circuit breaker being actuated by alternating current generated by said alternating current generator, means for transmitting alternating current through said cable and insulating said direct current circuit from said alternating current generator comprising a transformer having connection with said alternating current generator and the positive and negative conductors of said cable, a condenser interposed between said transformer and said positive conductor in said cable, and means to prevent the flow of alternating current from said cable to said locomotive or to said source of power supply to prevent loading of the locomotive circuit from opening said circuit breaker, but permitting grounds in the locomotive circuit to open said circuit breaker comprising a choke coil interposed between the positive conductor of said cable and said source of power supply, and another choke coil connected in said negative cable between said junction box and the controlling mechanism for said locomotive.

3. In combination with a reel and trolley locomotive, a direct current circuit including a cable having a positive and negative conductor, a junction box interposed between said direct current circuit and a source of power supply remote from the locomotive and adapted to have said cable connected thereto, and means contained wholly within said junction box for sending an alternating current through said direct current circuit and for disconnecting said cable from the source of power supply upon short circuit or grounding of said cable comprising a motor generator set including a direct current motor connected with said direct current circuit and an alternating current generator driven thereby for sending an alternating current through said direct current circuit, a circuit breaker connected in said direct current circuit and actuated by said alternating current generator, a transformer having its primary connected across the terminals of said alternating current generator and having its secondary connected across the positive and negative conductors of said cable, a condenser interposed between the secondary of said transformer and the positive conductor of said cable, and means to prevent the flow of alternating current from said cable to said locomotive or to said source of power supply to prevent loading of the locomotive circuit from opening said circuit breaker, but permitting grounds in the locomotive circuit to open said circuit breaker comprising a choke coil interposed between the positive conductor of said cable and said source of power supply, and another choke coil connected in said negative cable between said junction box and the controlling mechanism for said locomotive.

4. In a reel and trolley locomotive, a direct current propelling motor having an electric circuit which is insulated from the locomotive frame, a cable reel having a double conductor cable adapted to be wound thereon for transmitting power to said motor and a junction box adapted to be positioned at a source of power supply and have the free end of said cable connected thereto, means for disconnecting said cable from the source of power supply upon short circuit of said cable comprising an alternating current generator adapted to transmit an alternating current circuit through said cable, a circuit breaker actuated by said alternating current circuit upon loading of said generator to a predetermined amount, and means to prevent loading of said locomotive circuit from loading said alternating current circuit and opening said circuit breaker, but permitting grounds in said locomotive circuit to operate said circuit breaker comprising a choke coil in said junction box interposed between said circuit breaker and the positive side of the line, and a choke coil on said locomotive interposed between said locomotive circuit and ground.

5. In a reel and trolley locomotive, a direct current propelling motor, a pair of rails along which the locomotive is adapted to run, the circuit for said motor being insulated from the locomotive frame, means for conducting electric power to said locomotive including a cable reel having a double conductor cable adapted to be wound thereon, a junction box adapted to be connected between one rail and a positive power line and a connection from said cable to said junction box, means for disconnecting said cable from the source of power supply upon short circuit of said cable or upon grounds in the circuit for said locomotive comprising means for transmitting an alternating current circuit through said cable, a circuit breaker actuated by said alternating current circuit, and means to prevent loading of said locomotive circuit from opening said circuit breaker, but permitting grounds in said locomotive circuit to operate said circuit breaker comprising a choke coil in said junction box interposed between said circuit breaker and the positive side of the line, and a choke coil on said locomotive interposed between said locomotive circuit and the negative conductor of said cable.

SIDNEY W. FARNHAM.